United States Patent
Krishnamurthy (10) Patent No.: US 9,621,308 B2
(45) Date of Patent: Apr. 11, 2017

(54) INTERFERENCE MEASUREMENTS IN ENHANCED INTER-CELL INTERFERENCE COORDINATION CAPABLE WIRELESS TERMINALS

(71) Applicant: Motorola Mobility LLC, Chicago, IL (US)

(72) Inventor: Sandeep H. Krishnamurthy, Sunnyvale, CA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 14/486,418

(22) Filed: Sep. 15, 2014

(65) Prior Publication Data
US 2015/0003275 A1  Jan. 1, 2015

Related U.S. Application Data

(63) Continuation of application No. 13/287,508, filed on Nov. 2, 2011, now Pat. No. 8,837,301.
(Continued)

(51) Int. Cl.
| | |
|---|---|
| H04L 1/20 | (2006.01) |
| H04L 1/00 | (2006.01) |
| H04W 24/02 | (2009.01) |
| H04B 17/24 | (2015.01) |
| H04B 17/345 | (2015.01) |

(Continued)

(52) U.S. Cl.
CPC ............ *H04L 1/203* (2013.01); *H04B 17/24* (2015.01); *H04B 17/345* (2015.01); *H04L 1/0026* (2013.01); *H04W 24/02* (2013.01); *H04B 7/063* (2013.01); *H04B 7/0639* (2013.01);
(Continued)

(58) Field of Classification Search
CPC .............................. H04L 1/203; H04W 24/02
See application file for complete search history.

(56) References Cited

U.S. PATENT DOCUMENTS

| | | |
|---|---|---|
| 7,440,509 B2 | 10/2008 | Baum |
| 7,583,760 B2 | 9/2009 | Bernhardsson et al. |

(Continued)

FOREIGN PATENT DOCUMENTS

| | | |
|---|---|---|
| EP | 1638224 B1 | 12/2006 |
| EP | 1811689 A1 | 7/2007 |

(Continued)

OTHER PUBLICATIONS

3GPP TSG-RAN WG1 #62 bis, R1-105793 "LS on time-domain extension of Rel 8/9 backhaul-based ICIC for Macro-Pico scenario" RAN1, Oct. 11-15, 2010, Xi'an, China 2 pages.
(Continued)

*Primary Examiner* — Xavier S. Wong
(74) *Attorney, Agent, or Firm* — Faegre Baker Daniels LLP (57) ABSTRACT

A wireless communication terminal is disclosed. The terminal includes a transceiver coupled to a processor configured to determine that a subset of a plurality of resource elements (REs) must be excluded from demodulation, the plurality of REs received in a signal from a first base station, to estimate a hypothetical block error rate (BLER) based on the signal received from the first base station by excluding the subset of the plurality of REs, and to estimate channel state information based on the hypothetical BLER.

20 Claims, 5 Drawing Sheets

Related U.S. Application Data (60) Provisional application No. 61/411,361, filed on Nov. 8, 2010.

(51) Int. Cl.

| H04B 7/06 | (2006.01) |
|---|---|
| H04W 24/10 | (2009.01) |
| H04W 28/04 | (2009.01) |
| H04B 17/327 | (2015.01) |

(52) U.S. Cl.
CPC ........... *H04B 17/327* (2015.01); *H04W 24/10* (2013.01); *H04W 28/04* (2013.01); *H04W 28/048* (2013.01)

(56) References Cited

U.S. PATENT DOCUMENTS

| 7,746,951 | B2 | 6/2010 | Hwang et al. |
| 7,773,705 | B2 | 8/2010 | Jung et al. |
| 7,883,760 | B2 | 2/2011 | Bogue |
| 8,456,996 | B2* | 6/2013 | Bhattacharjee et al. ...... 370/235 |
| 8,837,301 | B2* | 9/2014 | Krishnamurthy ..... H04L 1/0026 370/242 |
| 2004/0120288 | A1* | 6/2004 | Adjakple ................. H04L 1/20 370/333 |
| 2004/0252787 | A1* | 12/2004 | Yang ..................... H04L 1/0003 375/319 |
| 2005/0099973 | A1* | 5/2005 | Qiu et al. ...................... 370/328 |
| 2009/0005029 | A1 | 1/2009 | Wang et al. |
| 2009/0092178 | A1 | 4/2009 | Sayana et al. |
| 2009/0124261 | A1* | 5/2009 | Shimomura ........ H04W 72/082 455/436 |
| 2009/0196366 | A1* | 8/2009 | Shen ..................... H04L 5/0053 375/260 |
| 2009/0232073 | A1 | 9/2009 | Yan et al. |
| 2009/0238250 | A1* | 9/2009 | Kangas ............... H04L 25/0224 375/219 |
| 2009/0252077 | A1 | 10/2009 | Khandekar et al. |
| 2009/0264077 | A1 | 10/2009 | Damnjanovic |
| 2009/0325591 | A1 | 12/2009 | Liu et al. |
| 2010/0009705 | A1 | 1/2010 | Budianu et al. |
| 2010/0029262 | A1 | 2/2010 | Wang et al. |
| 2010/0034092 | A1* | 2/2010 | Krishnamurthy et al. ... 370/241 |
| 2010/0035615 | A1 | 2/2010 | Kitazoe et al. |
| 2010/0105317 | A1 | 4/2010 | Palanki et al. |
| 2010/0110901 | A1 | 5/2010 | Wong et al. |
| 2010/0111018 | A1 | 5/2010 | Chang |
| 2010/0112958 | A1 | 5/2010 | Krishnamurthy et al. |
| 2010/0118856 | A1* | 5/2010 | Krishnamurthy et al. ... 370/342 |
| 2010/0178912 | A1 | 7/2010 | Gunnarsson et al. |
| 2010/0190447 | A1 | 7/2010 | Agrawal et al. |
| 2010/0223522 | A1 | 9/2010 | Duggan |
| 2010/0240370 | A1 | 9/2010 | Pandit et al. |
| 2010/0254344 | A1* | 10/2010 | Wei ....................... H04W 16/10 370/330 |
| 2010/0271965 | A1 | 10/2010 | Siomina et al. |
| 2010/0272032 | A1 | 10/2010 | Sayana |
| 2010/0273498 | A1* | 10/2010 | Kim ...................... H04W 24/02 455/450 |
| 2010/0278132 | A1 | 11/2010 | Palanki et al. |
| 2010/0317343 | A1 | 12/2010 | Krishnamurthy et al. |
| 2010/0323693 | A1* | 12/2010 | Krishnamurthy et al. ... 455/434 |
| 2011/0002275 | A1* | 1/2011 | Shousterman ........ H04W 16/06 370/329 |
| 2011/0081933 | A1 | 4/2011 | Suh et al. |
| 2011/0096680 | A1* | 4/2011 | Lindoff et al. ................. 370/252 |
| 2011/0105144 | A1 | 5/2011 | Siomina et al. |
| 2011/0110251 | A1* | 5/2011 | Krishnamurthy et al. ... 370/252 |
| 2011/0143766 | A1 | 6/2011 | Sun et al. |
| 2011/0170496 | A1 | 7/2011 | Fong |
| 2011/0194551 | A1* | 8/2011 | Lee ....................... H04B 7/0626 370/342 |
| 2011/0194632 | A1 | 8/2011 | Clerckx et al. |
| 2011/0199986 | A1 | 8/2011 | Fong et al. |
| 2011/0249578 | A1* | 10/2011 | Nayeb Nazar et al. ...... 370/252 |
| 2011/0256861 | A1 | 10/2011 | Yoo et al. |
| 2011/0274097 | A1* | 11/2011 | Zhang et al. .................. 370/338 |
| 2011/0275394 | A1 | 11/2011 | Song et al. |
| 2011/0286346 | A1 | 11/2011 | Barbieri et al. |
| 2012/0063321 | A1* | 3/2012 | Chandrasekhar et al. .... 370/241 |
| 2012/0113844 | A1 | 5/2012 | Krishnamurthy |
| 2012/0122440 | A1 | 5/2012 | Krishnamurthy et al. |
| 2012/0122472 | A1 | 5/2012 | Krishnamurthy et al. |
| 2012/0300699 | A1* | 11/2012 | Kamuf et al. ................ 370/328 |
| 2013/0039254 | A1 | 2/2013 | Kim et al. |
| 2013/0077523 | A1* | 3/2013 | Ko ......................... H04W 24/00 370/252 |
| 2013/0083719 | A1* | 4/2013 | Seo et al. ...................... 370/312 |

FOREIGN PATENT DOCUMENTS

| WO | 9627246 | A1 | 9/1996 |
| WO | 0122600 | A2 | 3/2001 |
| WO | 2009129413 | A2 | 10/2009 |
| WO | 2009142559 | A9 | 11/2009 |
| WO | 2010053793 | A2 | 5/2010 |
| WO | 2010104334 | A2 | 9/2010 |
| WO | 2011-021974 | A1 | 2/2011 |
| WO | 2011057037 | A2 | 5/2011 |
| WO | 2011-099910 | A1 | 8/2011 |

OTHER PUBLICATIONS

3GPP TSG-RAN WG4 2010 AH#4, R4-103790 "Eicic rlm AND rrm REQUIREMENTS" (Qualcomm Incorporated, Oct. 11-15, 2010, Xi'an, China 5 pages.
3GPP TSG RAN WG1 #62bis, R1-105750 "[Draft] LS on time-domain extension of Rel 8/9 backhaul-based ICIC for Macro-Pio scenario" Alcatel-Lucent, Oct. 11-18, 2010, Xi'an China, 2 pages.
3GPP TSG RAN WG4 #AH-04, R4-103738 "Impact of Enhanced ICIC for Non-CA based Deployment on RAN4 Requirements" Ericsson, ST-Ericsson, Oct. 11-15, 2010, Xi'an China, 5 pages.
Patent Cooperation Treaty, "PCT Search Report and Written Opinion of the International Searching Authority" for International Application No. PCT/US2011/059248 Feb. 13, 2012, 30 pages.
3GPP TSG RAN WG4 #53, R4-094245 "Interference control for LTE Rel-9 HeNB cells" Nokia Siemens Networks, Nokia, Jeju, Korea, Nov. 9-13, 2009, 10 pages.
3GPP TSG RAN WG4 #57, R4-104648 "Paging Channel Reliability Issue in Idle Mode and ABSF Patterns" Motorola, Jacksonville, USA, Nov. 15-19, 2010, 5 pages.
David Lopez-Perez et al., "Enhanced Intercell Interference Coordination Challenges in Heterogeneous Networks" IEEE Wirless Communications, vol. 18, No. 3, Jun. 1, 2011, pp. 22-30.
3GPP TSG RAN WG4 #57, R4-104647 "Downlink Performance in the Presence of Interference from ABSFs" Motorola, Jacksonville, USA, Nov. 15-19, 2010, 8 pages.
3GPP TSG RAN WG4 #57, R4-104746 "Updated Downlink Performance Results for eICIC" Motorola, Jacksonville, USA, Nov. 15-19, 2010, 3 pages.
Lars Lindbom et al., "Enhanced Inter-cell Interference Coordination for Heterogeneous Networks in LTE-Advanced: A Survey" Dec. 6, 2011, pp. 1-18.
Krishnamurthy et al., "Interference Measurements in Enhanced Inter-Cell Interference Coordination Capable Wireless Terminals" U.S. Appl. No. 13/287,525, filed Nov. 2, 2011, 50 pages.
Patent Cooperation Treaty, "PCT Search Report and Written Opinion of the International Searching Authority" for International Application No. PCT/US2011/059268 Feb. 3, 2012, 20 pages.
3GPP TSG RAN WG2 Meeting #72, R2-106171 "Resource-specific measurement in Idle Mode for eICIC" New Postcom, Jacksonville (FL), USA, Nov. 15-19, 2010, 4 pages.
3GPP TSG RAN WG2 Meeting #71bis, R2-105991,[3GPP TSG RAN WG1 #62 bis, R1-105793, Xi'an, China, Oct. 11-15, 2010] LS on time-domain extension of Rel 8/9 backhaul-based ICIC for Macro-Pico scenario, Xi'an, China, Oct. 11-15, 2010, 2 pages.
3GPP TS 36.214 V9.2.0 (Jun. 2010), Technical Specification, 3rd Generation Partnership Project; Technical Specification Group (56) References Cited

OTHER PUBLICATIONS

Radio Access Network; Evolved Universal Terrestrial Radio Access (E-UTRA); Physical layer; Measurements (Release 9), 14 pages.

3GPP TSG RAN WG2 Meeting #72, R2-106171, "Resource-specific measurement in Idle Mode for eICIC," New Postcom, jacksonville (FL), Nov. 15-19, 2010.

Korean Intellectual Property Office, Notice of Preliminary Rejection for Korean Patent Application No. 10-2013-7011837, mailed Apr. 17, 2014.

Korean Intellectual Property Office, Notice of Preliminary Rejection for Korean Patent Application No. 10-2013-7011839, mailed Jul. 28, 2014.

State Intellectual Property Office of the People'S Republic of China, Notification of the First Office Action for Chinese Patent Application No. 201180053893.0, mailed May 19, 2014.

Krishnamurthy et al., "Method for Cell Search in Synchronous Interference Limited Channels" U.S. Appl. No. 12/981,724, filed Dec. 30, 2010, 47 pages.

United States Patent and Trademark Office, "Non-Final Rejection" U.S. Appl. No. 13/253,812 dated Feb. 23, 2012, 9 pages.

Patent Cooperation Treaty, "PCT Search Report and Written Opinion of the International Searching Authority" for International Application No. PCT/US2011/060317 Mar. 1, 2012, 14 pages.

3GPP TSG RAN WG1 #62, R1-104346 "Potential Problems and Performance Analysis in Time Domain Solutions to UE" CATT, Madrid, Spain, Aug. 23-27, 2010, 6 pages.

3GPP TSG RAN WG1 #62, R1-104864 "Enhanced ICIC for co-channel CSG deployments" Ericsson, ST-Ericsson, Madrid, Spain, Aug. 23-27, 2010, 6 pages.

3GPP TSG RAN WG1 #62bis, R1-105335 "Details of almost blank subframes" Ericsson, ST-Ericsson, Xi'an, China, Oct. 11-15, 2010, 6 pages.

3GPP TSG RAN WG1 #61, R1-102618 "Considerations on non-CA based heterogeneous deployments" Ericsson, ST-Ericsson, Montreal, Canada, May 10-14, 2010, 4 pages.

3GPP TSG RAN WG1 #62bis, R1-105551 "TDM eICIC coordination between macro eNBS and CSG Home eNBs." Nokia Siemens Networks, Nokia, Xi'an, China, Oct. 11-15, 2010, 6 pages.

3GPP TSG RAN WG2 #71bis R2-105786 "eICIC: Idle Mode consideations" Qualcomm Incorporated, Xi'an, China, Oct. 11-15, 2010, 2 pages.

United States Patent and Trademark Office, "Non-Final Rejection" for U.S. Appl. No. 13/253,812 dated Sep. 6, 2012, 16 pages.

\* cited by examiner

INTERFERENCE MEASUREMENTS IN ENHANCED INTER-CELL INTERFERENCE COORDINATION CAPABLE WIRELESS TERMINALS

CROSS REFERENCE TO RELATED APPLICATIONS

The present application is a continuation application to U.S. patent application Ser. No. 13/287,508 which claimed the benefit under 35 U.S.C. 119(e) to U.S. provisional Application No. 61/411,361 filed on 8 Nov. 2010, the contents of which are incorporated herein by reference.

FIELD OF THE DISCLOSURE

The present disclosure relates generally to wireless communications and, more particularly, to an apparatus and method for interference measurements in wireless communication terminals capable of enhanced inter-cell interference coordination when operating in a wireless communication network.

BACKGROUND

Wireless communication networks are well known. Some networks are proprietary, while others are compliant with one or more standards that allow various vendors to manufacture equipment for a common system. One such standards-based network is the Universal Mobile Telecommunications System (UMTS). UMTS is standardized by the Third Generation Partnership Project (3GPP), which is a collaboration of groups of telecommunications associations to make a globally applicable Third Generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device or terminal (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or non-contiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a time duration and is associated with a cyclic prefix (CP). A cyclic prefix is essentially a guard period between successive OFDM symbols in a subframe. According to the E-UTRA specification, a normal cyclic prefix is about five (5) microseconds and an extended cyclic prefix is 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include: such spatial parameters as rank indicator or the number of data streams sent on the same resources; precoding matrix index (PMI); and rank indicator (RI) and coding parameters, such as a modulation and coding scheme (MCS) or a channel quality indicator (CQI). Together MCS or CQI, PMI and RI constitute elements of the Channel State Information (CSI) which convey the quality of the MIMO channel indicative of the reliability and condition number of the channel capable of supporting multi-stream communication between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or subband frequency selective information of the parameters. The eNB may use the rank information, the CQI and other parameters, such as uplink quality information, to serve the UE on the uplink and downlink channels.

E-UTRA systems must be compliant to regulatory requirements on spurious emissions on licensed bands in different regions of the world. E-UTRA follows the "uplink after downlink" principle which means that a UE must transmit on its uplink only when its downlink is reliable. In other words, a UE that does not have a reliable downlink must continuously monitor the quality of the downlink signal by tracking the downlink signal quality (e.g., based on channel state estimation) and stop transmission on its uplink if the downlink signal quality falls below a threshold. In E-UTRA, this is enabled by means of Radio Link Monitoring (RLM) UE procedures where a UE continuously monitors a cell-specific reference signal (CRS) on the downlink and determines the channel state (including estimating the propagation channel between the eNB and the UE and the underlying interference on the same carrier). $Q_{out}$ is defined as the condition that the channel quality between eNB and the UE is such that the Block Error Rate (BLER) of a first hypothetical PDCCH transmission exceeds 10%. This event is also denoted as an "out-of-sync" event. $Q_{in}$ is defined as the condition that the channel quality between the eNB and the UE is such that the BLER of a second hypothetical PDCCH transmission drops below 2%. This event is also denoted as an "in-sync" event. The UE monitors the channel state in RRC_CONNECTED mode continuously or periodically in both non-discontinuous reception (non-DRX) and discontinuous reception (DRX) states to evaluate whether $Q_{out}$ or $Q_{in}$ has occurred. Upon several successive $Q_{out}$ detections, the UE must determine that a Radio Link Problem (RLP) has occurred. In the RLP state, the UE must assume that it has lost its downlink with the serving eNB and start monitoring the link for recovery. If a $Q_{in}$ is detected within a certain time duration as configured by the eNB by means of a Radio Resource Control (RRC) timer, the UE resumes normal RRC_CONNECTED operation. On the other hand, if a Qin is not detected within the time duration, the UE must determine that a Radio Link Failure (RLF) has occurred and must stop all uplink transmission within 40 ms. The RLM procedure reduces the probability that a UE jams the uplink of a neighbor cell when the UE has lost the serving cell downlink but has not been handed over by the network to a different cell due to Radio Resource Management (RRM) inefficiencies.

Like other 3GPP standards, E-UTRA supports mobility of UEs by RRM measurements and associated support for RRC signaling including specified eNB and UE behavior in both RRC_CONNECTED and RRC_IDLE states. In the RRC_CONNECTED state, a UE can be configured to measure and report Reference Signal Received Power (RSRP) and Reference Signal Received Quality (RSRQ) for both the serving cell and the neighbor cells (on the serving cell carrier and inter-frequency carriers). A network element such as the eNB or the Mobility Management Entity (MME) can perform UE handovers based on the reported measurements. In RRC_IDLE state, the UE can be configured to measure RSRP and RSRQ and perform cell reselections based on these measurements.

Heterogeneous networks comprise a variety of base stations serving mobile stations. In some systems, the base stations operate on the same carrier frequency. The variety of base stations can include some or all of the following types of base stations: conventional macro base stations (macro cells), pico base station (pico cells), relay nodes and femto base stations (also referred to as femto cells, closed subscriber group (CSG) cells or Home eNodeBs). Macro cells typically have coverage areas that range from several hundreds of meters to several kilometers. Pico cells, relays and femto cells can have coverage areas that are considerably smaller than the coverage area of typical macro cells. Pico cells can have coverage areas of about 100-200 meters. Femto cells are typically used for indoor coverage, and can have coverage areas in the 10 s of meters. Relay nodes are characterized by a wireless backhaul to a donor base station, and can have coverage areas similar to pico cells.

A home-base station or femto-cell or pico-eNB or relay node (RN) is referred to as hetero-eNB (HeNB) or a hetero-cell or hetero base station in the sequel. A HeNB can either belong to a CSG as mentioned earlier or can be an open-access cell. HeNBs are used for coverage in a small area (such as a home or office) in contrast with eNBs (also referred to as macro eNBs or macro-cells) which are typically used for coverage over a large area. A CSG is set of one or more cells that allow access only to a certain group of subscribers. HeNB deployments where at least a part of the deployed bandwidth (BW) is shared with macro-cells are considered to be high-risk scenarios from an interference point-of-view. When UEs connected to a macro-cell roam close to a HeNB, the uplink of the HeNB can be interfered with particularly when the HeNB is far away (for example >400 m) from the macro-cell, thereby, degrading the quality of service of UEs connected to the HeNB. The problem is particularly troublesome if the UE is not allowed to access the HeNB that it roams near (for example, due to the UE not being a member of the CSG of the HeNB). Currently, the existing LTE Rel-8/9 UE measurement framework can be made use of to identify the situation when this interference might occur and the network can handover the UE to an inter-frequency carrier which is not shared between macro-cells and HeNBs to mitigate this problem. However, there might not be any such carriers available in certain networks over which to handover the UE. Further, as the penetration of HeNBs increases, being able to efficiently operate HeNBs on the entire available spectrum might be desirable for maximizing spectral efficiency and reducing overall operational cost. Several other scenarios are likely too, including the case of a UE connected to a HeNB experiencing interference from an adjacent HeNB or a macro cell. The following types of interference scenarios have been identified.

HeNB (aggressor)→MeNB (victim) downlink (DL)
HUE (aggressor)→MeNB (victim) uplink (UL)
MUE (aggressor)→HeNB (victim) UL
MeNB (aggressor)→HeNB (victim) DL
HeNB (aggressor)→HeNB (victim) on DL
HeNB (aggressor)→HeNB (victim) on UL.

Heterogeneous networks can potentially enable an operator to provide improved service to users (e.g., increased data rates, faster access, etc.) with lower capital expenditure. Typically, installation of macro base stations is very expensive as they require towers. On the other hand, base stations with smaller coverage areas are generally much less expensive to install. For example, pico cells can be installed on roof tops and femto cells can be easily installed indoors. The pico and femto cells allow the network to offload user communication traffic from the macro cell to the pico or femto cells. This enables users to get higher throughput and better service without the network operator installing additional macro base stations or provisioning more carrier frequencies for communication. Thus, heterogeneous networks are considered to be an attractive path for evolution of wireless communication networks. 3GPP has commenced work on enabling heterogeneous E-UTRA networks in 3GPP LTE Rel-10.

Figure 1:
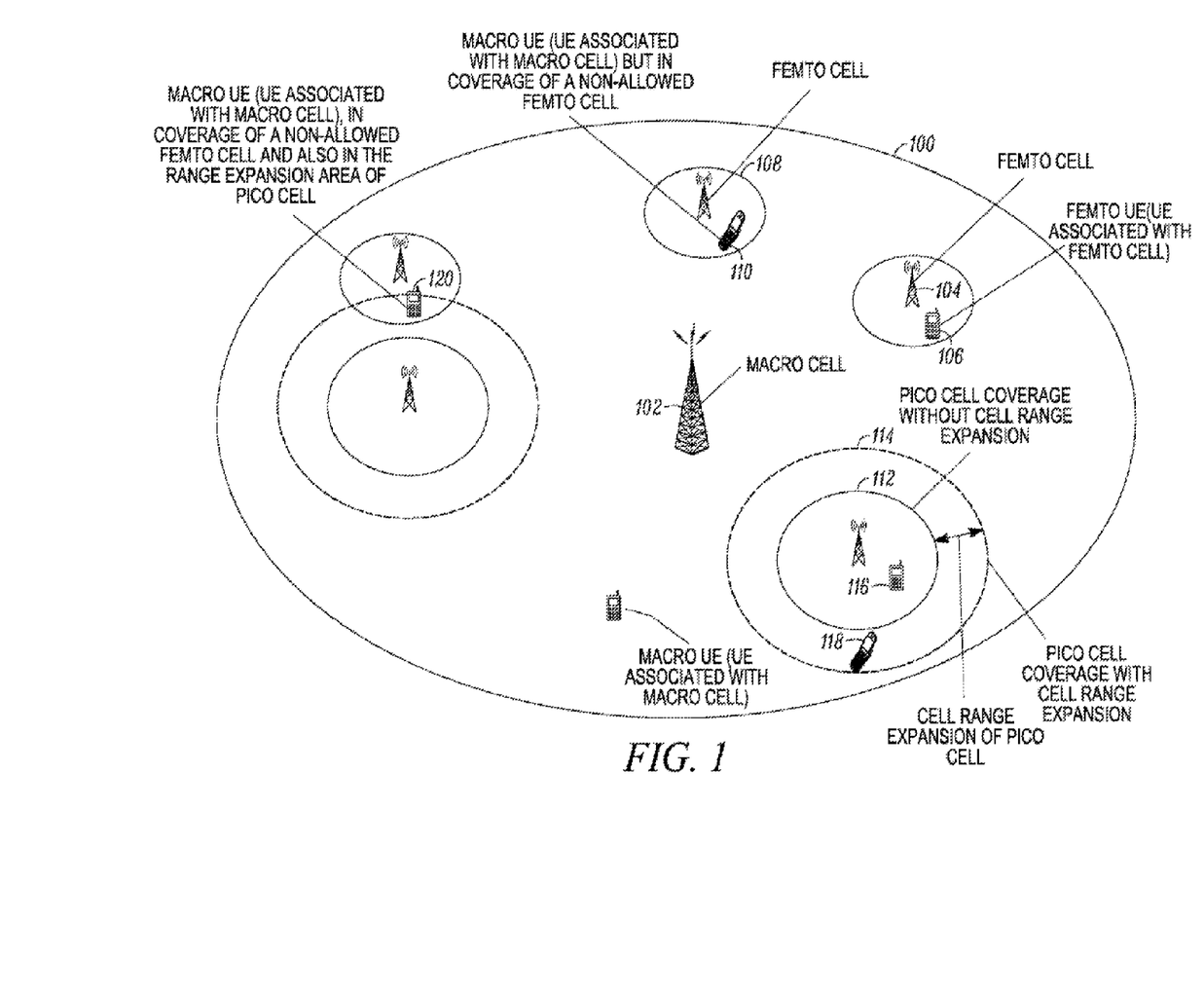
FIG. 1 illustrates a prior art Heterogeneous network comprising macro cells, pico cells, and femto cells.
Figure 2:
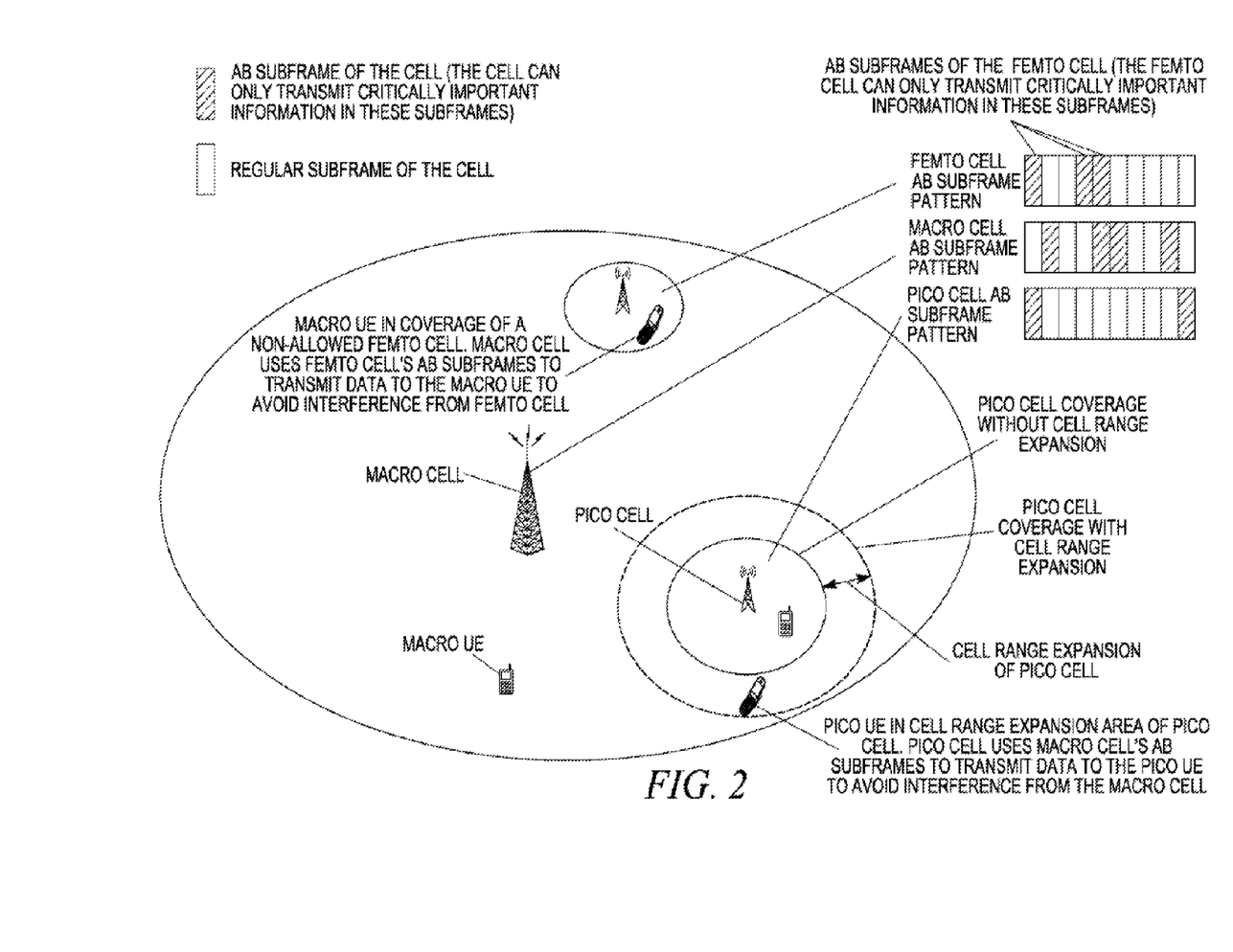
FIG. 2 is an electrical block diagram of a wireless communication system providing wireless communication service to a wireless communication device.

FIG. 1 illustrates an E-UTRA Heterogeneous network comprising a macro cell, pico cells and femto cells operating on a single carrier frequency. A mobile station, also referred to as "user equipment" (UE), may be associated with one of the cells based on its location. The association of a UE to a cell can refer to association in idle mode or connected mode. That is, a UE is considered to be associated with a cell in idle mode if it is camped on the cell in idle mode. Similarly, a UE is considered to be associated with a cell in connected mode if it is configured to perform bi-directional communication with a cell (for example, a UE in E-UTRA radio resource control (RRC) connected mode can be connected to and therefore associate with a cell). A UE associated with a macro cell is referred to as a macro UE, a UE associated with a pico cell is referred to as a pico UE, and a UE associated with a femto cell is referred to as a femto UE.

Various time-division approaches are possible for ensuring that base stations in heterogeneous networks share the frequency spectrum while minimizing interference. Two approaches can be envisioned. A network can configure time periods when different base stations are required to not transmit. This enables cells that can interfere with one another to transmit in mutually exclusive time periods. For example, a femto cell can be configured with some time periods during which it does not transmit. If a macro UE is located within the coverage of the femto cell, the macro cell can use the time periods during which the femto cell does not transmit data to the UE.

The network can configure time periods where a first base station transmits on all available time periods (e.g., pico eNBs), while a second base station (e.g., macro eNB) transmits only on a subset of the available time periods. A UE connected to the first base station can therefore have two "virtual" channels at different channel qualities depending on how much the second base station's transmission interferes with that for the first (i.e., signal geometry of the first base station relative to the second). The first virtual channel is where only the first base station transmits data while the second base station does not transmit data. The second virtual channel is one where both the first and the second base stations transmit data. The first base station can use adaptive modulation and coding and schedule at different MCS levels on the two virtual channels. In the extreme case, the first base station may not schedule at all on the second virtual channel when interference from the second base station is large.

However, it should be noted that time division approaches can lead to inaccurate or inconsistent RRM, RLM and CSI measurements. For example, if a macro UE located near a femto cell performs measurements during time periods when the femto cell transmits, the measured values can be significantly different from measured values obtained from measurements made during time periods when the femto cell does not transmit. Such measurements can lead to erratic behaviors, such as failed connections, unnecessary handovers and unnecessary cell reselections. In addition, such inaccuracies can lead to suboptimal scheduling on UE downlink leading to inefficient utilization of spectral resources. Therefore, methods are needed for performing measurements of cells that overcome the problems mentioned above.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

The accompanying drawings where like reference numerals refer to identical or functionally similar elements throughout the separate views and which together with the Detailed Description below are incorporated in and form part of the specification, serve to further illustrate various embodiments and to explain various principles and advantages all in accordance with the one or more embodiments of the disclosure.

Skilled artisans will appreciate that elements in the figures are illustrated for simplicity and clarity and have not necessarily been drawn to scale or to include every component of an element. For example, the dimensions of some of the elements in the drawings may be exaggerated alone or relative to other elements, or some and possibly many components of an element may be excluded from the element, to help improve the understanding of the various embodiments of the disclosure.

DETAILED DESCRIPTION

Femto cells are generally used in homes and offices and their precise location and configuration is not entirely under the network operator's control. For example, two femto cells located in nearby homes can have the same physical layer cell identifier (PCID). A femto cell can be a restricted access cell such as a CSG cell. In FIG. 1, the Heterogeneous network 100 comprises a macro cell 102, femto cells 104, 108, 122, pico cells 112, 124 and mobile stations or UEs 106, 110, 116, 118, 120, 126. If the UE 110 is not a member of the CSG to which the femto cell 108 belongs, the UE 110 may be unable to access the femto cell. Even if the UE 110 is very close to such a femto cell 108, the UE may be associated with the macro cell. The UE may then experience significant interference to its communication with the macro cell due to transmissions of the femto cell.

Pico cells generally do not restrict access to specific users. However, some operator configurations can allow pico cells to restrict access to certain users. Pico cells are generally under the network operator's exclusive control and can be used to enhance coverage in locations where the macro cell signal quality may be inadequate. Furthermore, in order to increase offloading of users to pico cells, a network operator can have an association bias towards the pico cell. In FIG. 1 for example, a UE 118 may be made to associate with a pico cell even if the pico cell 112 is not the strongest cell at the UE's 118 location. This is referred to as "cell range expansion" of the pico cell. A UE is said to be in the cell range expansion area of a pico cell, if it associates with the pico cell only if an association bias is used, and associates with another cell (e.g., a macro cell 102) if the association bias is not used. If a UE 118 is in the cell range expansion area of the pico cell 112 and is associated with the pico cell 112, it can experience significant interference due to transmissions of a neighbor cell (such as a macro cell 102).

In order to operate multiple cells with overlapping coverage on a carrier frequency, such as in the heterogeneous network 100 in FIG. 1, it is necessary to have coordination between the cells so that the transmissions from the different cells do not interfere with one another. E-UTRA heterogeneous networks will use time division techniques to minimize interference. Specifically, a cell can be configured with patterns of subframes during which it does not schedule user data. Such subframes are referred to as "Blank subframes". Furthermore, it may be necessary to transmit certain non-data (e.g., certain control) information in all subframes. For example, it may be necessary to transmit cell-specific reference symbols (CRS) to enable UEs to perform measurements during the subframe. It may also be necessary to transmit primary and secondary synchronization signals (P-SCH and S-SCH, and jointly denoted as "P/S-SCH"), primary broadcast channel (PBCH) and System Information Block 1 (SIB1), Paging Channel, Positioning Reference Signal (PRS) and Channel State Information Reference Signal (CSI-RS). Such information is essential for proper operation of functions such as cell search and maintenance of up-to-date system information. Blank subframes which are not used for scheduling data but can be used for transmission of a restricted set of information (such as the information described above) are referred to as "Almost blank subframes" (AB subframes or ABS or ABSF, and ABSs and ABSFs indicate the plural form of an "almost blank subframe"). In each ABS being transmitted from a base station, the base station can be configured to not transmit any energy on all resource elements, except for resource elements used at least one of (a) CRS, (b) P-SCH and S-SCH, (c) PBCH, (d) SIB1, (e) paging messages, (f) PRS and (g) CSI-RS.

ABSs of one cell can be used by a neighboring cell to schedule UEs associated with that cell. As indicated earlier, a UE that is associated with a certain cell may be in connected mode or in idle mode. In connected mode, scheduling the UE involves unidirectional or bidirectional transfer of control plane or data plane information. In idle mode, the UE is configured to receive paging messages from the cell. For example, a femto cell, a macro cell and a pico cell can be configured with an ABS pattern (i.e., a sequence of subframes with a certain time reuse, where a subset of the subframes are configured as ABSs and the remainder configured for normal downlink scheduling). The patterns can be such that the ABSs of different cells can overlap. Alternatively the patterns can be mutually exclusive, so that ABSs of two cells do not overlap. Also, some cells may not be configured with an AB subframe pattern. As indicated above, a cell can be configured to only transmit critically important information during its AB subframes.

The use of AB subframe patterns is described further below. A macro UE may be in the coverage of a non-allowed femto cell, such as a CSG cell whose CSG the UE is not a member. In FIG. 1, UE 110 represents such a UE and femto cell 108 represents such a femto cell. Such a macro UE can experience interference from the femto cell, making communication between the macro UE and the macro cell difficult. To overcome the interference, the macro cell can transmit data to the UE only in the ABSs of the femto cell. Since the femto cell only transmits important non-data signals in the ABSs, the macro cell can avoid most of the interference from the femto cell and successfully transmit data to the macro UE in the ABSs of the femto cell.

Similarly, a pico UE may be in the cell range expansion area of the pico cell. In FIG. 1, UE 118 represents such a pico UE and pico cell 112 represents such a pico cell. Such a pico UE can experience a high interference from a neighbor cell, such as macro cell 102), making communication between the pico UE and the pico cell difficult. In order to overcome the interference, the pico cell can transmit data to the UE only in the ABSs of the macro cell. Since the macro cell only transmits important non-data signals in the AB subframes, the pico cell can avoid most of the interference from the macro cell and successfully transmit data to the pico UE in the AB subframes of the macro cell. Further, the pico cell can also transmit in the non-ABSs of the macro cell, but can schedule a lower MCS to account for the degraded signal quality in such subframes.

When different cells use different patterns of ABSs, the RRM, RLM and CSI measurements performed by UEs in the heterogeneous network can result in unpredictable and undesirable behavior. UEs perform RLM measurements in connected mode to ensure that the serving cell signal conditions are adequate to schedule the UE. UEs perform RRM measurements to support handovers in connected mode and reselections in idle mode. UE performs CSI measurements to support optimal scheduling by the base station. For example, in FIG. 1, macro UE 110 in the coverage of a non-allowed femto cell 108 may be performing RLM measurements of the macro cell 102 signal. Due to interference from the femto cell 108 in subframes during which the femto cell schedules (i.e., not the ABSs of the femto cell), the macro UE can conclude that the radio link between the macro cell and the macro UE has failed. The UE can make such a conclusion even if it can be successfully scheduled by the macro cell during the ABSs of the femto cell.

Similarly, in FIG. 1, the macro UE 110 in the coverage of a non-allowed femto cell 108 may be performing RRM measurements of the serving cell and neighbor cells. Due to interference from the femto cell, the UE may measure a low value macro cell signal level and transmit a measurement report indicating the low value to the network. As a result of the measurement report, the network can perform a handover of the UE to another frequency or to another radio access technology, such as UMTS or GSM. This is an undesirable outcome, as the UE can be successfully scheduled by the macro cell in the femto cell's ABSs.

Similarly, in FIG. 1, the macro UE 110 in the coverage of a non-allowed femto cell 108 may be performing CSI measurements of the serving cell. Due to interference from the femto cell, the UE may measure a low value of the macro cell's channel quality and transmit a low value of CQI (and potentially a low value of RI or a suboptimal value of PMI) to the network. As a result of the low value of CQI, the base station can avoid scheduling the UE or transmit a very small amount of data to the UE. Thus, the data rate experienced by the UE is reduced, although it may be possible to maintain a high data rate for the UE by scheduling during the femto cell's ABSs.

Similar observations can be made for pico UEs. In FIG. 1, for example, a pico UE 118 in the coverage expansion area of a pico cell 112 can conclude that the radio link between the pico UE and the pico cell has failed due to interference from the macro cell 102. The pico UE 118 in the coverage expansion area of a pico cell 112 can report low measured values for the pico cell signal level resulting in a handover away from the pico cell. In order to overcome these problems, it is necessary to restrict measurements performed by the UE to certain subframes.

Given that different cells can be configured with different ABS patterns, methods are needed for determining which subframes should be used by a UE to perform various measurements under different scenarios. In the foregoing, the embodiments are described in the context of ABSs. However, it should be clear that the same methods are applicable to blank subframes and subframes that are only partially used for scheduling. That is, subframes in which only some of the time-frequency resources are used for scheduling. In the context of the disclosure, measurements can include, but are not limited to, one or more of (a) measurements required to perform cell identification, (b) RRM measurements such as RSRP and RSRQ measurements of cells detected by the UE, (c) measurements required for performing radio link monitoring, or (d) channel state measurements, such as measurements needed for performing channel state information reporting and channel quality indication reporting.

Figure 3A:
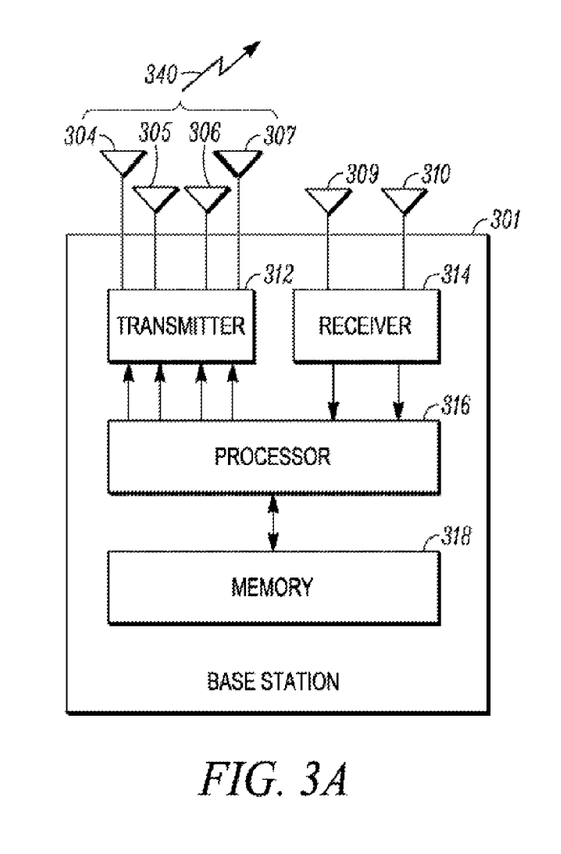
FIGS. 3A and 3B illustrate electrical block diagrams of an exemplary base station and a wireless communication device, respectively.
Figure 3B:
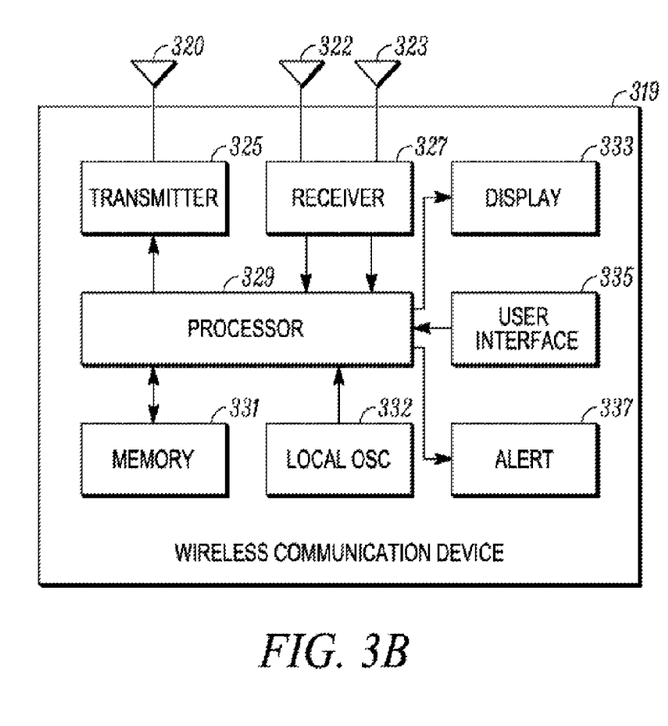

FIGS. 3A and 3B illustrate electrical block diagrams of a UE and an exemplary eNB usable in the wireless communication system. Each base station 301 can include one or more transmit antennas 304-307 (four shown for illustrative purposes), one or more receive antennas 309, 310 (two shown for illustrative purposes), one or more transmitters 312 (one shown for illustrative purposes), one or more receivers 314 (one shown for illustrative purposes), one or more processors 316 (one shown for illustrative purposes), and memory 318. Although illustrated separately, the transmitter 312 and the receiver 314 may be integrated into one or more transceivers as is well understood in the art. By including multiple transmit antennas 304-307 and other appropriate hardware and software as would be understood by those of ordinary skill in the art, the base station 301 may support use of a multiple input and multiple output (MIMO) antenna system for downlink (base station-to-wireless communication device) communications. The MIMO system facilitates simultaneous transmission of downlink data streams from multiple transmit antennas 304-307 depending upon a channel rank, for example as indicated by the wireless communication device 319 or as preferred by the base station 301. A rank supplied by the UE or enables the base station 301 to determine an appropriate multiple antenna configuration (e.g., transmit diversity, open loop spatial multiplexing, closed loop spatial multiplexing, etc.) for a downlink transmission in view of the current downlink channel conditions.

The base unit processor 316, which is operably coupled to the transmitter 312, the receiver 314, and the memory 318, can be one or more of a microprocessor, a microcontroller, a digital signal processor (DSP), a state machine, logic circuitry, any combination thereof, or any other device or combination of devices that processes information based on operational or programming instructions stored in the memory 318. One of ordinary skill in the art will appreciate that the processor 316 can be implemented using multiple processing devices as may be required to handle the processing requirements of the present disclosure and the various other functions of the base station 301. One of ordinary skill in the art will further recognize that when the processor 316 has one or more of its functions performed by a state machine or logic circuitry, the memory containing the corresponding operational instructions can be embedded within the state machine or logic circuitry as opposed to being external to the processor 316.

The memory 318, which may be a separate element as depicted in FIG. 3A or may be integrated into the processor 316, can include random access memory (RAM), read-only memory (ROM), FLASH memory, electrically erasable programmable read-only memory (EEPROM), removable memory, a hard disk, and/or various other forms of memory as are well known in the art. The memory 318 can include various components, such as, for example, one or more program memory components for storing programming instructions executable by the processor 316, one or more address memory components for storing an identifier associated with the base station 301 as well as for storing addresses for wireless communication devices currently in communication with the base station 301, and various data storage components. The program memory component of the memory 318 may include a protocol stack for controlling the transfer of information generated by the processor 316 over the data and/or control channels of the E-UTRA. It will be appreciated by one of ordinary skill in the art that the various memory components can each be a group of separately located memory areas in the overall or aggregate memory and that the memory 318 may include one or more individual memory elements.

In one embodiment, the base station transmitter 312, receiver 314, and processor 316 are designed to implement and support a wideband wireless protocol, such as the Universal Mobile Telecommunications System (UMTS) protocol, the E-UTRA protocol, the 3GPP Long Term Evolution (E-UTRA) protocol, or a proprietary protocol, operating to communicate digital information, such as user data (which may include voice, text, video, and/or graphical data) and/or control information, between the base station 301 and the UE 319 over various types of channels. In an E-UTRA system, an uplink data channel may be a PUSCH, an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH.

In FIG. 3A, when the base station 301 implements the E-UTRA standard, the base station processor 316, in one embodiment, includes a logical channel coding and multiplexing section for implementing channel coding and multiplexing of control information and positioning reference signals destined for transmission over a downlink subframe 340. The channel coding and multiplexing section is a logical section of the base station processor 316, which performs the coding and multiplexing responsive to programming instructions stored in memory 318. The channel coding and multiplexing section may include one channel coding block for encoding control channel information (e.g., channel quality indicators, cell-specific reference symbols (CRS), rank indicators, and hybrid automatic repeat request acknowledgments (HARQ-ACK/NACK) into associated transmission resources (e.g., time-frequency resource elements) and another block for encoding positioning reference signals and other information typically communicated over the primary/secondary synchronization channel (e.g., P/S-SCH) into associated transmission resources. The channel coding and multiplexing section of the processor 316 may include additional coding blocks for encoding various other types of information and/or reference symbols used by the wireless communication device 201 for demodulation and downlink channel quality determination. The channel coding and multiplexing section of the processor 316 also includes a channel multiplexing block that multiplexes the encoded information generated by the various channel coding blocks into a subframe, which is supplied to the transmitter 312 for downlink transmission.

In FIG. 3B, each wireless communication device 319 can include one or more transmit antennas 320 (one shown for illustrative purposes), one or more receive antennas 322, 323 (two shown for illustrative purposes), one or more transmitters 325 (one shown for illustrative purposes), one or more receivers 327 (one shown for illustrative purposes), a processor 329, memory 331, a local oscillator 332, an optional display 333, an optional user interface 335, and an optional alerting mechanism 337. Although illustrated separately, the transmitter 325 and the receiver 327 may be integrated into one or more transceivers as is well understood in the art. By including multiple receive antennas 322, 323 and other appropriate hardware and software as would be understood by those of ordinary skill in the art, the UE may facilitate use of a MIMO antenna system for downlink communications.

The wireless communication device transmitter 325, receiver 327, and processor 329 are designed to implement and support a wideband wireless protocol, such as the UMTS protocol, the E-UTRA protocol, the 3GPP E-UTRA protocol or a proprietary protocol, operating to communicate digital information, such as user data (which may include voice, text, video, and/or graphical data) and/or control information, between the UE and a serving base station 301 over control and data channels. In an E-UTRA system, an uplink data channel may be a PUSCH and an uplink control channel may be a PUCCH. Control information may be communicated over the PUSCH and/or the PUCCH. Data is generally communicated over the PUSCH.

In FIG. 3B, the processor 329 is operably coupled to the transmitter 325, the receiver 327, the memory 331, the local oscillator 332, the optional display 333, the optional user interface 335, and the optional alerting mechanism 337. The processor 329 utilizes conventional signal-processing techniques for processing communication signals received by the receiver 327 and for processing data and control information for transmission via the transmitter 325. The processor 329 receives its local timing and clock from the local oscillator 332, which may be a phase locked loop oscillator, frequency synthesizer, a delay locked loop, or other high precision oscillator. The processor 329 can be one or more of a microprocessor, a microcontroller, a DSP, a state machine, logic circuitry, or any other device or combination of devices that processes information based on operational or programming instructions stored in the memory 331. One of ordinary skill in the art will appreciate that the processor 329 can be implemented using multiple processors as may be required to handle the processing requirements anticipated by the present disclosure and the various other included functions of the UE. One of ordinary skill in the art will further recognize that when the processor 329 has one or more of its functions performed by a state machine or logic circuitry, the memory containing the corresponding operational instructions can be embedded within the state machine or logic circuitry as opposed to being external to the processor 329.

In FIG. 3B, the memory 331, which may be a separate element as depicted or it may be integrated into the processor 329, can include RAM, ROM, FLASH memory, EEPROM, removable memory (e.g., a subscriber identity module (SIM) card or any other form of removable memory), and/or various other forms of memory as are well known in the art. The memory 331 can include various components, such as, for example, one or more program memory components for storing programming instructions executable by the processor 329 and one or more address memory components for storing addresses and/or other identifiers associated with the wireless communication device 201 and/or the base stations 203-205. The program memory component of the memory 331 may include a protocol stack for controlling the transfer of information generated by the processor 329 over the data and/or control channels of the E-UTRA system, as well as for controlling the receipt of data, control, and other information transmitted by the different cells in the E-UTRA system. It will be appreciated by those of ordinary skill in the art that the various memory components can each be a group of separately located memory areas in the overall or aggregate memory and that the memory 331 may include one or more individual memory elements.

The display 333, the user interface 335, and the alerting mechanism 337 are all well-known elements of wireless communication devices. For example, the display 333 may be a liquid crystal display (LCD) or a light emitting diode (LED) display and associated driver circuitry, or utilize any other known or future-developed display technology. The user interface 335 may be a key pad, a keyboard, a touch pad, a touch screen, or any combination thereof, or may be voice-activated or utilize any other known or future-developed user interface technology. The alerting mechanism 337 may include an audio speaker or transducer, a tactile alert, and/or one or more LEDs or other visual alerting components, and associated driver circuitry, to alert a user of the wireless communication device 319. The display 333, the user interface 335, and the alerting mechanism 337 operate under the control of the processor 329.

In E-UTRA Rel-10 methods for supporting enhanced inter-cell interference coordination (eICIC) techniques will be specified. Such methods are targeted towards increasing the spectral utilization of licensed (and unlicensed) bands by the deployment of Heterogeneous networks. Small to large handover bias has been considered for the macro/pico case where a pico UE in the coverage extension region of a pico cell (i.e., pico cell is not the strongest cell) is forced to associate with the said pico cell. Such a UE connected to a pico cell can experience elevated interference due to macro cell transmission in ABSs when scheduled by the pico cells in the macro cell's ABSs relative to when the macro cell transmission is absent (i.e., macro cells is configured for blank subframe transmission). This is because, a ABS always contains CRS and can potentially contain other channels such as P/S-SCH, PBCH, PCFICH, PHICH, PDSCH (associated with Paging and SIB1) and Positioning Reference Signal (PRS). Although, the pico cell transmission is received at a better signal quality over the macro cell's ABSs relative to non-ABSs, the quality of pico cell transmission in the macro cell's ABSs may still be inadequate to maintain association with the pico cell specially when legacy LTE Rel-8/9 receivers are implemented in the UE. Several interference mitigation techniques for rejecting or cancelling interference of various signals in the ABSs is known in prior art. Among such methods are:

1.) CRS interference rejection by suitable modification to LLRs including nulling REs associated with the pico cell transmission that overlap with the macro cell CRS transmission in a given subframe.

2.) Processing of pico cell P/S-SCH post subtraction of the estimated macro cell P/S-SCH from the received signal.

3.) Decoding of pico cell PDCCH post blind detection of macro cell PDCCH transmission followed by subtraction of the macro cell PDCCH component from the received signal. This method might require higher-layer assistance signal associated with the macro cell PDCCH transmission.

4.) PCFICH/PHICH interference rejection by suitable modification to LLRs including nulling REs associated with the pico cell transmission that overlap with the macro cell PCFICH/PHICH transmission in a given subframe. This method might require higher-layer assistance signal associated with the macro cell PCFICH/PHICH transmission.

For the macro/femto case where a macro UE roams close to a CSG femto cell, a macro UE both in RRC_CONNECTED and RRC_IDLE states similarly experiences elevated interference due to femto DL transmission even when the macro cell is transmitting on the femto's ABSs.

For both the macro/pico and the macro/femto cases, the serving cell transmits a measurement pattern comprising subframes on which the UE is expected to perform RRM/RLM/CSI measurements. The restricted subframe measurement pattern is configured such that the UE performs measurements mostly on the ABSs of the dominant neighbor cell (i.e., the macro cell in the macro/pico case for a pico UE and a femto cell in the macro/femto case for the macro UE). Since ABSs contain at least the CRS and possibly other downlink signals transmitted by the dominant neighbor cell, the RLM/RRM/CSI measurements as defined in the E-UTRA Rel-9 specification will likely be inadequate in supporting efficient deployment of Heterogeneous networks.

Specifically, E-UTRA Rel-9 measurements and procedures as described in TS 36.213, TS 36.214 and TS 36.133 are likely inadequate to cope with large interference signals present in ABSs. These issues are addressed further herein.

In accordance to 3GPP RAN Working Group 1 (i.e., RAN1) Liaison Statement R1-105793, ABSs are defined as follows:

UEs can assume the following about ABSs:
   All ABSs carry CRS
   If P-SCH/S-SCH/PBCH/SIB1/Paging/PRS coincide with an ABS, they are transmitted in the ABS (with associated PDCCH when SIB1/Paging is transmitted)
   Needed for legacy support
   Channel State Information Reference Signal (CSI-RS) transmission on ABS is For Further Study (FFS)
   No other signals are transmitted in ABSs
   If ABS coincides with Multicast-Broadcast Single Frequency Network (MBSFN) subframe not carrying any signal in data region, CRS is not present in data region
   MBSFN subframe carrying signal in data region shall not be configured as ABS Although, RAN1 has primarily considered restricted subframe measurements (i.e., UE performing RRM/CSI/RLM measurements over set of subframes signaled by the serving eNB) for RRC connected mode, in RAN4, it has been proposed previously to extend this concept to idle mode RRM measurements to address the macro/femto interference problem.

In cell range expansion (CRE) for the macro/pico case, a macro UE may be scheduled only on a subset of all possible subframes that corresponds to non-ABSs of the macro cell and the macro cell may not schedule any UE in the ABSs. In this set up, the pico cell may schedule its UEs both on subframes that coincide with the macro cell ABSs and subframes that coincide with macro cell non-ABSs. When medium to large HO bias (>4 dB) is used, this can lead to two sets of subframes each with different DL signal quality levels or two "virtual" channels with different downlink signal qualities.

In order that medium to large CRE (e.g., 4+dB cell association bias) can be supported, a UE must implement a interference rejection (IR) receiver or a interference cancellation (IC) receiver to eliminate the interference from one or more of the above-listed signals present in the ABS. Such a receiver capability may also be necessary in the macro/femto case to enable a macro UE to remain connected to the macro cell under strong interference from a nearby non-allowed CSG femto cell. With such a capability, a UE will be able to remain connected to the desired cell (i.e., pico cell in the macro/pico case and macro cell in the macro/femto case) that is (e.g., 4+dB) weaker than the strongest cell (i.e., macro cell in the macro/pico case and femto cell in the macro/femto case).

Typically, both channel estimation and interference estimation are carried out on CRS-bearing OFDM symbols. It is possible that some advanced receivers implement decision-directed methods that make use of PDCCH or PDSCH packet-coded transmissions with a CRC field in their channel/interference estimation algorithms. Therefore, the receiver may be making use of both CRS-bearing OFDM symbols and non-CRS-bearing OFDM symbols in CSI/RLM measurements. For some measurements such as RSRQ, the E-UTRA specification TS 36.214 mandates that the UE make use of only the CRS-bearing OFDM symbols in RSSI estimation.

As per TS 36.214, RSRQ is defined as, RSRQ=N*RSRP/(12*RSSI) for measurement over N Physical Resource Blocks (PRBs), where RSSI is total received power over the N PRBs used in the measurement.

In Heterogeneous networks, the frame timing between different cells may need to be aligned in order that interference coordination in time and/or frequency is possible. For a UE with a capability to support interference coordination methods, it may be generally assumed that the serving cell and the dominant neighbor cell are frame-time aligned or at least the time difference between the respective received signals from the serving cell and the dominant neighbor cell are such that all signal multipath components are well-contained within the CP length. Furthermore, it may be assumed that both channel estimation and interference estimation are carried out based on serving cell's CRS-bearing OFDM symbols.

When the cell association bias is large (i.e., 4+dB), some problems in RRM/CSI/RLM measurements can arise due to the fact that the UE is not connected to the strongest cell. Specifically, two problems are identified herein.

Problem #1 Description: RSSI Estimates Used in RSRQ Measurements

Recall that RSRQ=N*RSRP/RSSI where RSSI, the total received power, is estimated over the same N PRBs used for estimating RSRP. If a CRS IR/IC receiver is used, the impact of rejection/cancellation of neighbor cell CRS interference must be reflected in the RSSI measurement. RSRQ measurements are used for:

estimating the PDSCH load from neighbor cell and performing inter-frequency HOs for load-balancing in RRC connected mode, and triggering an inter-frequency or inter-RAT cell reselection and for determining that a E-UTRA cell is suitable reselection candidate RRC_IDLE mode.

In addition, if the IR/IC receiver is capable of rejecting other downlink signals present in the neighbor cell ABSs, it must take into account of the effect of such rejection or cancellation of interference from P/S-SCH, PCFICH, PHICH, PDCCH, or PDSCH into the RSSI measurement.

A Rel-10 UE might be capable of remaining on a given E-UTRA layer due to large macro cell interference in the macro/pico case due to IR/IC-type receivers. In the macro/femto case, a Rel-10 may be capable of remaining on a E-UTRA carrier even in the presence of strong CSG femto cell interference. However, with the current definitions of RSRQ as per TS 36.214 v 9.0.0, a Rel-10 UE might under-estimate RSRQ relative when there is no signal present in the dominant neighbor cell transmission. This can lead to unnecessary inter-frequency handovers in RRC_CONNECTED mode and unnecessary inter-frequency or inter-Radio Access Technology (inter-RAT) reselections in RRC_IDLE mode in the presence of large interference from neighbor transmissions in its ABSs (including at least the CRS and possibly other downlink channels such as P/S-SCH, PCFICH, PHICH, PDCCH, or PDSCH), even when the receiver is capable of rejecting or canceling such interference. Therefore, the RSRQ measurement likely needs modification to take into account UE's advanced receiver capability. A first embodiment described below addresses this issue.

Problem #2 Description: Channel and Noise Variance Estimates Used in CSI and RLM Measurements The channel estimator performance depends on whether or not the neighbor cell CRS collides with serving cell CRS. The number of CRS transmit (Tx) antenna ports used by the serving cell can be different from the number of CRS ports used by the dominant interferer. For example, a CSG femto cell might have deployed 2 Tx antennas, while the macro cell might have deployed 4 Tx antennas resulting only in collision to serving cell Tx port #0 and port #1 in the femto cell CRS case collides with macro CRS cell.

When there is CRS collision, two types of receivers can be envisioned: (1) Interference Cancellation (IC) type 1 receiver where the channel response is estimated sequentially where the neighbor cell channel is estimated first followed subtracting the estimated neighbor cell signal from the received signal and this is followed by serving cell channel estimation; (2) IC type 2 receiver where joint channel estimation methods such as Minimum Mean-Squared Estimation (MMSE) or Maximum Likelihood Estimation (MLE) or Least-Squares Estimation (LSE) or DFT-based Channel Estimation are used. In both methods, the UE estimates the noise variance in addition to the channel. Both channel estimation and noise variance estimation must be modified relative to a LTE Rel-9 baseline receiver to address large CRS interference in the colliding CRS case. Such methods are however outside the scope of the disclosure.

When there is no CRS collision, simpler methods such as puncturing the REs that correspond to neighbor cell's CRS transmission prior to decoding of the PDCCH/PDSCH are likely sufficient when the interference primarily due to neighbor cell CRS transmission in the ABSs. This approach is referred to as Log-Likelihood Ratio (LLR) nulling. Alternately, interference rejection can be used by taking into different noise variances on REs that coincide with neighbor cell transmission (e.g., CRS) and REs that do not. This can be accomplished by using LTE Rel-8/9 receiver methods for estimating the noise variance on REs that do not overlap with neighbor cell CRS transmission and making use of neighbor cell RSRP measurement to estimate the noise variance on REs that overlap with neighbor cell CRS transmission. Both LLR nulling and noise variance adjustment methods can lead to having to modify RLM and CSI measurements to accurately reflect the improvement in a LTE Rel-10 receiver relative to the LTE Rel-9 baseline. A second embodiment described below addresses this issue.

According to the first embodiment, in order to properly reflect that gains from an IR/IC receiver that can reject/cancel neighbor cell's CRS and other downlink signal (P/S-SCH, PBCH, PHICH, PCFICH, PDCCH, PDSCH and PRS) transmissions contained in neighbor ABS, the RSRQ measurement must be modified. The RSSI definition in TS 36.214 can be, for example, modified to:

$$RSSI'=RSSI-\hat{P}_N,$$

where RSSI is the total received power measured over N RBs (i.e., same N RBs used for estimating RSRP) and $\hat{P}_N$ is the estimated neighbor cell power over the N RBs due to CRS transmission (and possibly due to other DL transmissions such as P/S-SCH/PBCH/PHICH/PCFICH/PDCCH/PDSCH in the neighbor cell ABS) that are either rejected or cancelled by the IR/IC receiver. Some characteristics of $\hat{P}_N$ estimation are as follows:

i. If only the neighbor cell CRS (in neighbor cell ABS) interferes with RSSI measurements, $\hat{P}_N$ includes the component from CRS only. In this scenario, $\hat{P}_N = N_{sc} \cdot N \cdot RSRP_N$, where N is the number of RBs over which RSSI is measured and $RSRP_N$ is the RSRP estimate for the neighbor cell who's CRS is being rejected/cancelled by the UE receiver and $N_{sc}$ is the number of subcarriers in one RB. The normalization factor of $N_{sc} \cdot N$ is necessary because, RSRP is defined on a per-subcarrier basis and there are $N_{sc} \cdot N$ subcarriers in N RBs. In E-UTRA, $N_{sc}=12$. With this, the modified RSSI measurement then becomes, $RSSI'=RSSI-N_{sc} \cdot N \cdot RSRP_N$. As a result, the measured RSRQ can be written as $RSRQ=N \cdot RSRP/(RSSI-\hat{P}_N)= N \cdot RSRP/(RSSI-N_{sc} \cdot N \cdot RSRP_N)$, where RSRP in the numerator corresponds to the measurement for the target cell, where the target cell is either the serving cell or a neighbor cell and $RSRP_N$ is the interfering neighbor cell's RSRP.

ii. If neighbor cell P/S-SCH and PBCH that are present in its ABSs interfere with some PRBs on the CRS-bearing OFDM symbols on which RSSI is being measured (e.g., due to symbol shifting of pico cells relative to macro cells), then the excess signal measurement due to such signals can be estimated and included in $\hat{P}_N$. Alternatively, wideband RSSI measurements that exclude at least the center 6 PRBs of the CRS-bearing OFDM symbols on which there is neighbor cell P/S-SCH and PBCH transmissions can be used.

iii. Similarly, if other downlink signals such as neighbor cell PHICH, PCFICH, PDSCH, and PRS transmissions overlap with the REs over which RSSI is being measured, the excess signal contribution due to one or more of these signals can also be included in $\hat{P}_N$.

As indicated earlier, the absence of this modification to RSSI can lead to the following problems in Rel-10 capable of IR/IC:

i. The UE's measurement in RRC_CONNECTED which includes the neighbor cell CRS component in the RSSI estimate leads to an over-estimation of the neighbor cell PDSCH load (i.e., under-estimation of RSRQ) and increased unnecessary load-balancing HOs; and ii. There UE might perform inter-frequency/inter-RAT reselections in RRC_IDLE unnecessarily even when the UE is capable of remaining camped on the serving cell (that is not the strongest) in the presence of a strong CSG interferer.

The UE can determine that a modification to RSSI is necessary based either on receiving a signal from its serving base station (e.g., in a RRC message) or based on determining that it is in the proximity of a dominant neighbor base station (e.g., neighbor cell RSRP exceeds a either predetermined threshold or a threshold signaled by the serving base station).

According to a second embodiment, the restricted subframe pattern signaled to a LTE Rel-10 UE for RLM/CSI measurements can be configured by the network such that the UE measures ABSs of the dominant neighbor cell interferer that contain only the CRS. But sometimes, it is difficult to avoid interference from neighbor cell P/S-SCH, PBCH, PCFICH, PHICH, PDSCH transmissions.

Even when RLM/CSI measurements are performed on ABSs containing only CRS two modifications relative to LTE Rel-9 baseline may be necessary.

For RLM measurements, the hypothetical BLER estimate being determined for Qout and Qin evaluation (see Section 7 of TS 36.133) must take into account the IR/IC receiver operation that is rejecting/canceling CRS interference prior to PDCCH decoding. The term "hypothetical BLER" is used herein to mean the BLER associated with the hypothetical packet-coded transmission.

For CSI measurements, the IR/IC receiver operation that is rejecting canceling CRS interference prior to PDCCH/PDSCH decoding.

For both RLM/CSI measurements, if the IR/IC receiver is capable of rejecting/canceling other signals such as the neighbor cell P/S-SCH, PBCH, PHICH, PCFICH, PDCCH, PDSCH and PRS, the measurements must reflect this capability as well.

As per TS 36.213 and TS 36.133, in both RLM and CSI measurements, a BLER associated with a hypothetical packet-coded transmission is determined as follows:

Step 1. The subcarrier signal to noise ratio (SINR) is estimated from the channel and noise variance estimates;

Step 2. An effective SINR metric (using the Effective Signal-to-noise-ratio Method or EESM) or a Mean Mutual Information per Bit (MMIB) metric is computed based on the estimated SINR; and Step 3. The estimated EESM or MMIB metric is mapped to a hypothetical BLER[1] using the appropriate link mapping function (e.g., the mapping function is identical to a AWGN link curve if the MMIB metric is used).

The hypothetical packet-coded transmission can corresponds to PDCCH DCI formats 1A/1C for RLM measurements.

The hypothetical packet-coded transmission can corresponds to turbo-coded transmission with a code rate associated with an MCS, for example an entry from the MCS table in TS 36.213 for CQI measurements.

If interference rejection (e.g., LLR nulling) or interference cancellation (e.g., cancellation of CRS interferer) is being used by the UE receiver prior to PDCCH/PDSCH decoding, then the improved PDCCH/PDSCH performance due to these enhancements must be reflected in the hypothetical BLER computation. Towards that end, methods are described below.

Figure 4:
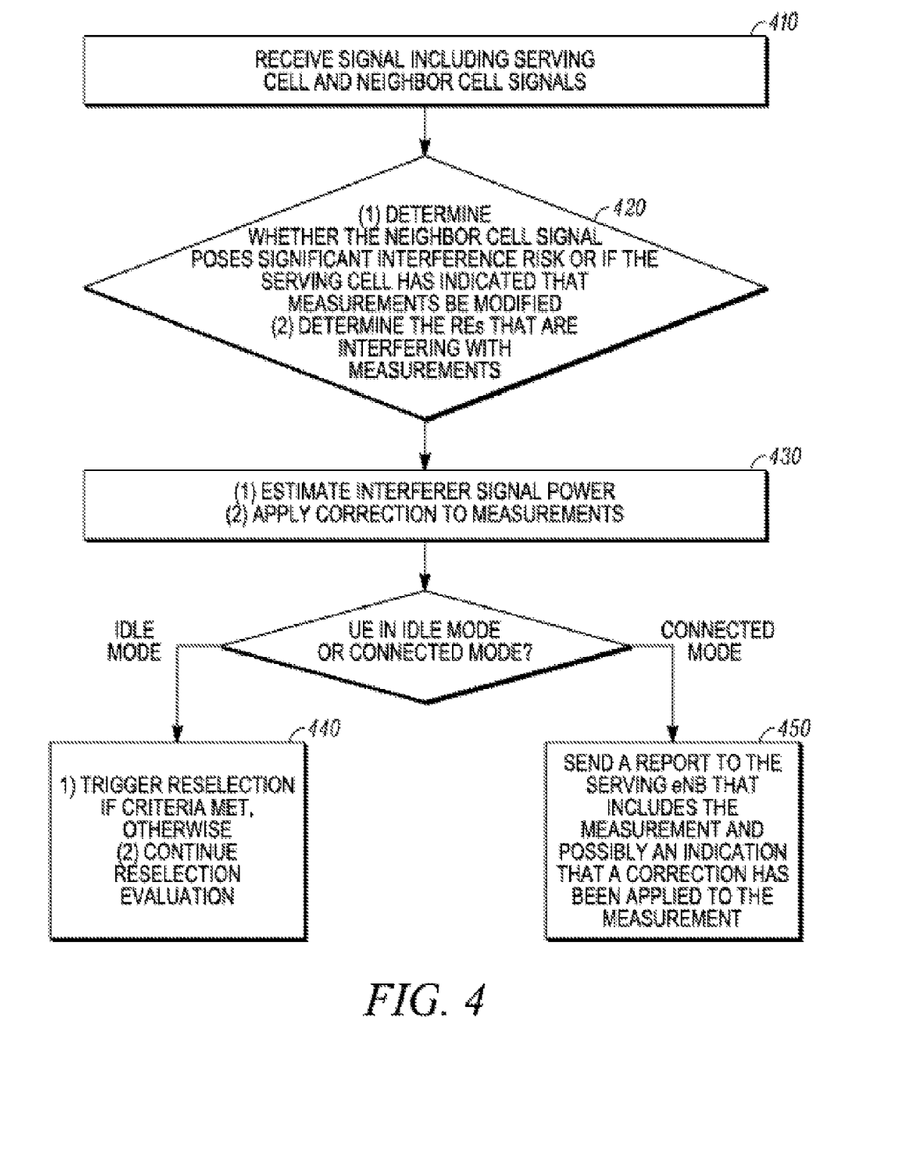
FIG. 4 illustrates the flowchart for RRM measurements.

FIG. 4 presents a flowchart illustrating an exemplary embodiment of the first embodiment indicating a sequence of UE receiver operations associated with the embodiment. At 410, the UE receives a signal including serving cell and neighbor cell signals. At 420, the UE determines whether the neighbor cell signal poses a risk of significant or problematic interference or if the serving cell has indicated that measurements be modified. The UE also determine the resource elements that are interfering with signal measurements. At 430, the UE estimates interfere signal power and applies a correction to the measurements. At 440, if the UE is in idle mode, reselection is triggered if certain criteria are satisfied, otherwise if the criteria are not satisfied reselection evaluation is continued. At 450, if the UE is not in idle mode, the UE sends a report to the serving eNB including the measurement and the neighbor cell identifier and possibly an indication that a correction has been applied to the measurement.

LLR Nulling Receiver Case

According to a LLR nulling receiver embodiment, if LLR nulling is applied prior to PDCCH/PDSCH decoding to the REs that experience elevated interference levels, Step 2 above can be modified to Step 2' as below.

Step 2'. An effective SINR metric or MMIB metric is computed based on the estimated SINR by excluding at least the REs that are interfered by the CRS transmission from the neighbor base station.

The set of REs that must be excluded can be determined from the IR/IC capabilities of the receiver (i.e., whether the IR/IC is capable of rejecting/cancelling CRS only or if the receiver can reject/cancel other downlink signals present in the ABS as well). For CRS, P/S-SCH and PBCH, the REs that must be excluded are known as soon as the receiver determines the neighbor cell frame/symbol timing (e.g., from neighbor cell search). For other signals such as PCFICH and PHICH, higher layer signaling of neighbor cell configurations can be made use of to inform the UE about the REs that overlap with the neighbor cell ABS transmission. For PDCCH, higher-layer signaling of CCE occupied in the neighbor cell ABSs can be used for reducing the complexity of the IR/IC receiver. For PDSCH, neighbor cell's resource allocation (RA) can be indicated by higher-layer signaling can be used for reducing the complexity of the IR/IC receiver. Alternately, one can envision a receiver where blind PDCCH decoding and PDSCH RA determination for the neighbor cell ABSs is performed followed cancellation of the detected signal. Such cancellation can include decoding the said PDCCH or PDSCH transmission, signal reconstruction based on the decoded signal and subtraction of the said reconstructed signal from the received signal. Once the interfering PDCCH or PDSCH is cancelled, the receiver can then proceed to demodulate the desired signal.

For CRS IR or IC, higher layer assistance signaling may indicate the neighbor cell's number of CRS transmit antenna ports, PCID, and transmission bandwidth. In addition, the type of the ABS (i.e., normal, MBSFN or fake uplink subframe) may be indicated in higher layer signaling assistance data.

The assistance data may contain information pertaining to the set of signals present in each ABS within the ABS pattern. For example, the ABS may contain CRS only, or may contain one or more of the downlink channels: P/S-SCH, PBCH, PHICH, PCFICH, PDCCH, PDSCH, PRS and CSI-RS. Assistance data may indicate which of the one or more signals are present in a specific ABS. This may be signaled separately for each ABS within the ABS pattern.

When LLR nulling is used, the effective code rate of the packet-coded transmission is increased as the LLR associated with the REs that are being interfered with are not utilized in decoding. If the performance loss relative to the no ABS interference case where such LLR nulling is not used is not negligible, a modified mapping function associated with the increased code-rate code must be used. This can be accomplished by modifying Step 3 to Step 3' as below.

Step 3'. The estimated EESM/MMIB metric is mapped to a hypothetical BLER using a mapping function different from the mapping function used for the no LLR nulling and no ABS interference case.

Interference Rejection Receiver Case

Alternately, if interference rejection is used, the increased noise variance on the REs due to neighbor cell CRS transmission can be incorporated into Step 1 by scaling the channel power by the appropriate noise variance in the SINR computation. The noise variance on REs that coincide with neighbor cell CRS transmission is a sum of: received neighbor cell CRS power of the neighbor cell; and residual interference+noise estimated based on processing the serving cell CRS REs.

Neighbor cell RSRP computed in Step a. above can be from clean observations in the restricted subframes configured for RRM measurements. In other words, LLR in a IR receiver can be computed as:

$$LLR_{i,k} = \begin{cases} s_{i,k}/\hat{\sigma}_{N+I}^2 & \text{non-overlapping} \\ s_{i,k}/(\hat{\sigma}_{N+I}^2 + RSRP_N) & \text{overlapping} \end{cases}$$

where $LLR_{i,k}$ is the LLR metric for the i-th bit associated with the QAM transmission on the k-th subcarrier, $s_{i,k}$ is the dual-min metric for the i-th bit associated with the QAM transmission on the k-th subcarrier, $\hat{\sigma}_{N+I}^2$ is the noise variance estimate for REs that do not overlap with neighbor cell CRS transmission (e.g., determined using step b. above) and $RSRP_N$ is the neighbor cell RSRP. The neighbor cell RSRP can be for example estimated on the subframes in the restricted set of subframes as indicated by the serving cell for RRM measurements. The "non-overlapping" case is applicable to REs that do not overlap with neighbor cell CRS transmission. The "overlapping" case is applicable to REs that overlap with neighbor cell CRS transmission and therefore, the total noise power is increased to $(\hat{\sigma}_{N+I}^2 + RSRP_N)$ which must be accounted for in the LLR computation.

Figure 5:
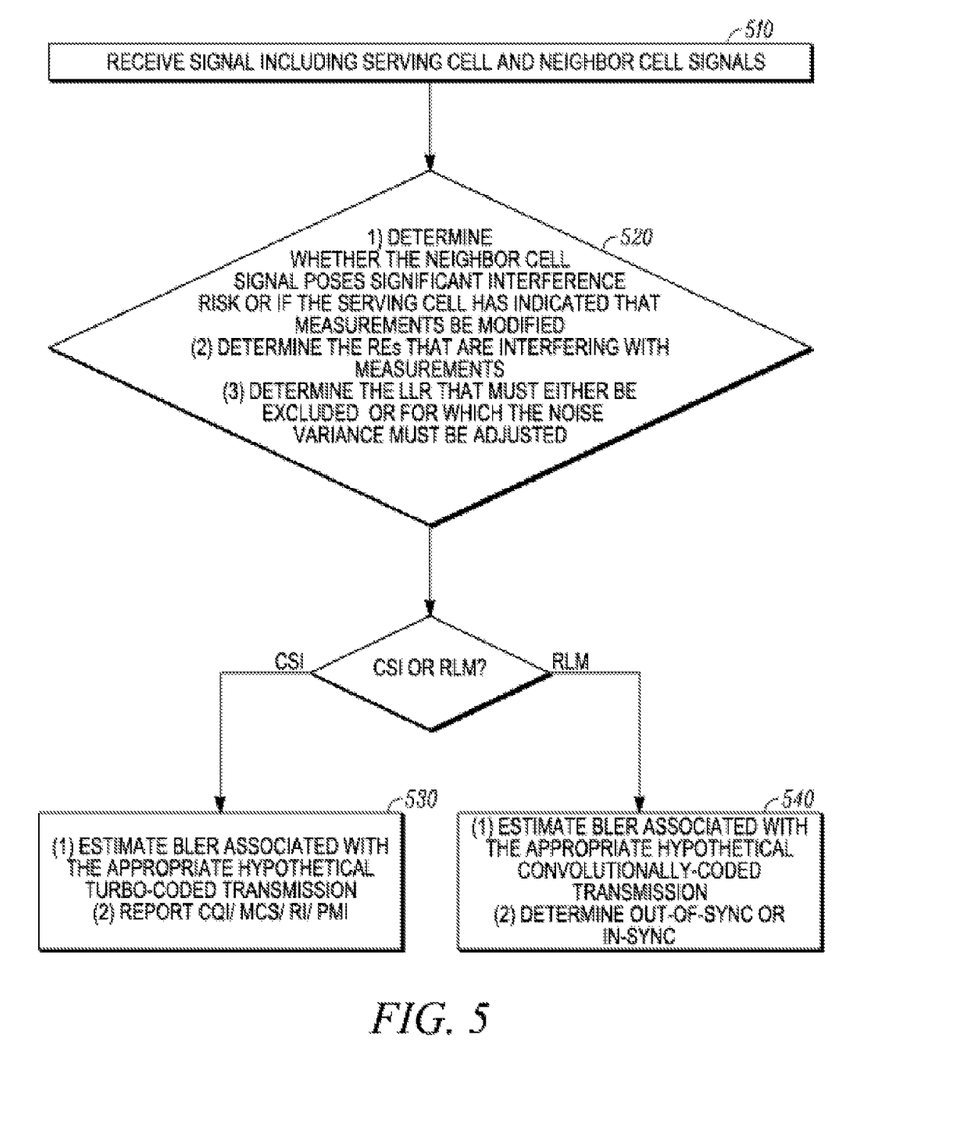
FIG. 5 illustrates the flowchart for RLM and CSI measurements.

FIG. 5 presents a flowchart associated with second embodiment indicating the operations in a UE receiver. At 510, the UE receives a signal including serving cell and neighbor cell signals. At 520, the UE determines whether the neighbor cell signal poses a risk of significant or problematic interference or if the serving cell has indicated that measurements be modified. The UE determines the resource elements that are interfering with signal measurements. The UE also determines the LLR that must be either excluded or for which the noise variance must be adjusted. At 530, to report channel state information (CSI), the UE estimates a BLER associated with a hypothetical turbo-coded transmission, and reports channel quality (CQI) or the modulation coding scheme (MCS) or rank index (RI) or precoding matrix index (PMI). At 540, for radio link monitoring (RLM), the UE estimates a BLER associated with a hypothetical convolutionally coded transmission, and determines whether the radio link between the eNB and the UE is in-sync or out-of sync as part of Radio Link Monitoring.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued.

What is claimed is:

1. A wireless communication terminal comprising:
a transceiver coupled to a processor,
the processor configured to receive, at the wireless communication terminal, a signal over a plurality of REs including a first transmission from a first base station and a second transmission from a second base station;
the processor configured to determine a first subset of a plurality of resource elements (REs) in a signal received at the terminal, the first subset being the first transmission from the first base station,
the processor configured to determine a second subset of the plurality of REs that include both the first transmission and the second transmission;
the processor configured to determine a first channel state including a first noise variance corresponding to the first subset of the plurality of REs;
the processor configured to determine a second channel state including a second noise variance corresponding to the second subset of the plurality of REs; and
the processor configured to estimate a hypothetical block error rate (BLER) based on the first channel state, the second channel state, the first noise variance and the second noise variance.

2. The terminal of claim 1, the processor configured to estimate the first noise variance based on a cell-specific reference signal (CRS) transmission from the first base station.

3. The terminal of claim 1 further comprising:
the processor configured to estimate a Reference Signal Received Power (RSRP) for the second base station; and
the processor configured to estimate the second noise variance based on the RSRP.

4. The terminal of claim 3 further comprising, the processor configured to measure RSRP over subframes determined based on a measurement pattern received from the first base station, the measurement pattern indicating a set of subframes that must be used for measuring RSRP or a set of subframes that must be excluded while measuring RSRP.

5. The terminal of claim 1, the processor configured to determine a channel state information based on the hypothetical BLER wherein the channel state information is one of a channel quality indication, a modulation and coding scheme (MCS), a rank indication (RI), a precoding matrix indication (PMI), a out-of synchronization determination (Qout), and a in-sync determination (Qin).

6. The terminal of claim 1, wherein the signal transmitted over the plurality of REs includes a convolutionally-coded transmision.

7. The terminal of claim 6, wherein the convolutionally-coded transmission is a downlink control information (DCI) with format 1A or format 1C.

8. The terminal of claim 1, wherein the signal transmitted over the plurality of REs includes a turbo-coded transmission associated with a physical downlink shared channel (PDSCH).

9. The terminal of claim 1, wherein the hypothetical BLER is computed from the estimated channel state information using a mapping function.

10. The terminal of claim 1, the processor configured to determine the first and second subsets of the plurality of REs based on a physical cell identifier (PCID) information of the first and second base stations.

11. A method in a wireless communication terminal, the method comprising:
receiving, at the wireless communication terminal, a signal over a plurality of resource elements (REs) including a first transmission from a first base station and a second transmission from a second base station;
determining, by the wireless communication terminal, a first subset of a plurality of REs in a signal received at the terminal, the first subset being the first transmission from the first base station;
determining, by the wireless communication terminal, a second subset of the plurality of REs that include both the first transmission and the second transmission;

determining, by the wireless communication terminal, a first channel state including a first noise variance corresponding to the first subset of the plurality of REs;

determining, by the wireless communication terminal, a second channel state including a second noise variance corresponding to the second subset of the plurality of REs; and estimating, by the wireless communication terminal, a hypothetical block error rate (BLER) based on the first channel state, the second channel state, the first noise variance and the second noise variance.

12. The method of claim 11, wherein the determining the first noise variance includes estimating the first noise variance based on a cell-specific reference signal (CRS) transmission from the first base station.

13. The method of claim 11, further comprising:

estimating, by the wireless communication terminal, a Reference Signal Received Power (RSRP) for the second base station; and estimating, by the wireless communication terminal, the second noise variance based on the RSRP.

14. The method of claim 13, further comprising measuring RSRP over subframes determined based on a measurement pattern received from the first base station, the measurement pattern indicating a set of subframes that must be used for measuring RSRP or a set of subframes that must be excluded while measuring RSRP.

15. The method of claim 11, further comprising determining a channel state information based on the hypothetical BLER wherein the channel state information is one of a channel quality indication, a modulation and coding scheme (MCS), a rank indication (RI), a precoding matrix indication (PMI), a out-of synchronization determination (Qout), and a in-sync determination (Qin).

16. The method of claim 11, wherein the signal transmitted over the plurality of REs includes a convolutionally-coded transmision.

17. The method of claim 16, wherein the convolutionally-coded transmission is a downlink control information (DCI) with format 1A or format 1C.

18. The method of claim 11, wherein the signal transmitted over the plurality of REs includes a turbo-coded transmission associated with a physical downlink shared channel (PDSCH).

19. The method of claim 11, wherein the hypothetical BLER is computed from the estimated channel state information using a mapping function.

20. The method of claim 11, wherein determining the first and second subsets of the plurality of REs is based on a physical cell identifier (PCID) information of the first and second base stations.

* * * * *